United States Patent [19]

Rollins

[11] 4,306,847
[45] Dec. 22, 1981

[54] PELLETIZER

[75] Inventor: Kenneth E. Rollins, Baton Rouge, La.

[73] Assignee: George A. Roundtree, Denham Springs, La.

[21] Appl. No.: 196,926

[22] Filed: Oct. 14, 1980

[51] Int. Cl.³ .............................................. B28B 17/00
[52] U.S. Cl. .................................. 425/188; 425/314; 425/331; 425/362
[58] Field of Search ............... 425/222, 362, 188, 331, 425/314

[56] References Cited

U.S. PATENT DOCUMENTS

| 598,745 | 2/1898 | Perky | 425/362 |
|---|---|---|---|
| 1,495,551 | 5/1924 | Ylouses | 425/362 |
| 2,243,384 | 5/1941 | Lehvecke | 425/331 |
| 2,503,361 | 4/1950 | Studebaker | 425/222 |
| 2,914,797 | 12/1959 | Cavanagh | 425/331 |
| 2,984,860 | 5/1961 | Thomas | 425/331 |
| 3,049,750 | 8/1962 | Austin | 425/331 |
| 3,402,229 | 9/1968 | Felder | 425/362 |
| 3,880,566 | 4/1975 | Komarek et al. | 425/362 |
| 3,954,368 | 5/1976 | Kawakami et al. | 425/362 |
| 4,038,010 | 7/1977 | Bremer | 425/362 |
| 4,090,829 | 5/1978 | Fischer et al. | 425/73 |

*Primary Examiner*—Jay H. Woo
*Attorney, Agent, or Firm*—Roy, Kiesel, Patterson & McKay

[57] ABSTRACT

An apparatus for producing particles of essentially uniform size from plastic materials is provided comprising two oppositely rotating drums positioned parallel and adjacent one another to form a nip, one drum being hollow and having uniformly distributed perforations over a portion of its surface area; a scraper assembly which is located inside the hollow perforated drum; and a discharge means which ejects particles from the interior of the hollow drum.

2 Claims, 3 Drawing Figures

PELLETIZER

BACKGROUND OF THE INVENTION

1. Field of the Invention

This invention relates broadly to the formation of uniformly sized particles from pliable solid stock material and more particularly to the formation of pellets from plastic materials.

2. Prior Art

There are various types of particle forming devices known to the art. Typically, these devices use rotating perforated cyclinders to form the particles such as the device shown in Komarek, et al U.S. Pat. No. 3,880,566 entitled "Apparatus For Forming Spheroidal Particles" and issued Apr. 29, 1975.

Generally these prior art devices require stock material which have a limited range of consistency so that the material will not stick or adhere to a dry surface. Further, to obtain this required consistency, some stock materials must be heated and maintained for relatively long dwell of time in a mixer or extruder at a certain temperature level. When the limited stock material consistency requirements are not met, as often happens, the material adheres to the rollers thus requiring substantial down time for clean up operation.

SUMMARY OF THE INVENTION

Therefore, it is an object of this invention to provide an apparatus which forms uniformly sized particles from any type of plastic material on a wide range of consistencies.

Another object of this invention is to provide an apparatus which minimizes temperature dwell time of the stock material. to allow wider range of temperature during heat treatment.

Another object of this invention is to provide a particle forming apparatus which is easily cleaned to minimize down time and production loss.

Other objects and advantages of this invention will become apparent from the ensuing descriptions of the invention.

Accordingly, an apparatus for producing essentially uniformly sized particles from plastic stock materials is provided which comprises parallel drums rotating in opposite directions and positioned adjacent one another to form a nip into which the stock material is poured from a common extruder, one of which said drums being powered by a mechanical means with the other drum being hollow and uniformly perforated over an area of its surface; a mechanical means for scraping or cutting the plastic material at the inside surface of the hollow drum as that material is forced through the perforations by additional material poured into the above mentioned nip point; and a means for the discharge of these cut particles from the interior of the hollow perforated drum into a collection container.

PREFERRED EMBODIMENT OF THE INVENTION

Figure 1:
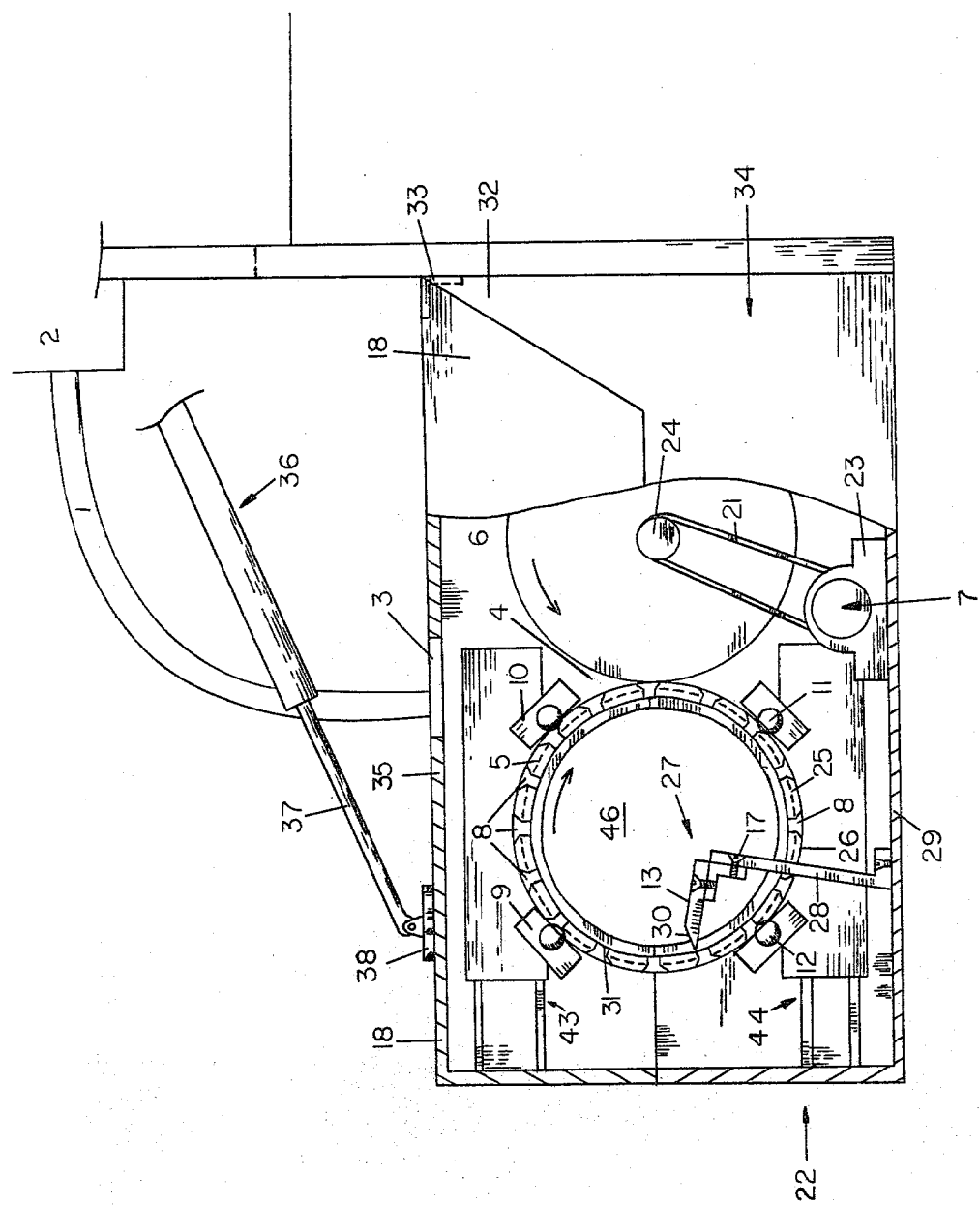
FIG. 1 is a cut-a-way side view of the particle forming apparatus.
Figure 2:
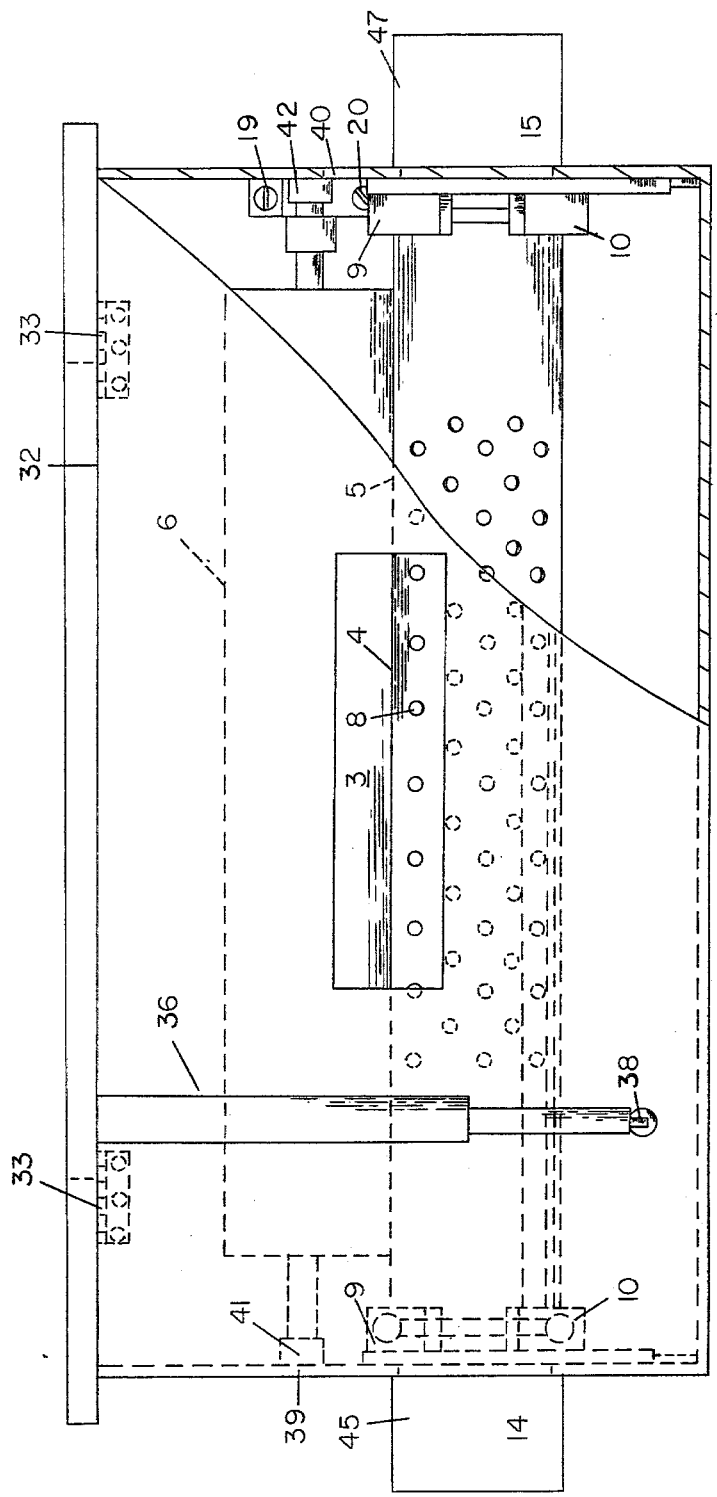
FIG. 2 is a view from the top of the particle forming apparatus.
Figure 3:
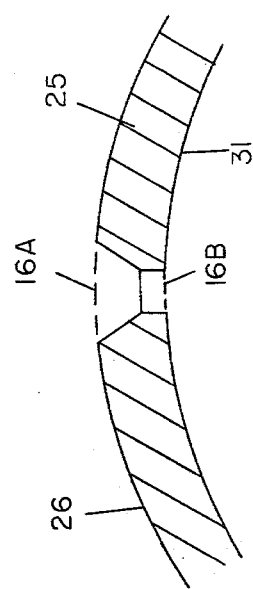
FIG. 3 is a cross-sectional view of one of the perforations in the hollow drum through which the plastic material is forced.

Referring now to the Figures the pellitizer comprises hollow drum 5 and drum 6 have a smooth surface rotatably mounted in container 22 having a removable lid 18. The drums are positioned parallel and adjacent one another to form a nip 4 so that as drive assembly 7 consisting of motor 23 conventionally connected to drum axle 24 by pulley belt 21 or gears rotates drum 6 counterclockwise causing drum 5 to rotate clockwise.

Drum 5 is constructed from a hollow cylinder metal shell 25 having perforations 8 uniformly distributed over a portion of shell surface 26. In a preferred embodiment perforations are Y-shaped with the outer apperature diameter 16A being twice that of the inner apperature 16B.

Scrapper assembly 27 comprises support arms 28 mounted to container floor 29 and blade 13 attached between arms 28 and having cutting edge 30 positioned parallel and adjacent a line along the inside surface 31 of shell 25. In a preferred embodiment, blade 13 is detachably mounted to support arm 28 by screws 17.

Container 22 is constructed with a lid 18 pivotedly hinged at corner 32 by hinges 33 which lid 18 fits over base 34 that houses the drums. Hydraulic lift assembly 36 having piston arm 37 pivotedly attached at one end by plate 38 to lid surface 38 and hydraulic casing attached to an extruder 2 is provided to raise lid 18 when desired. Lid 18 is provided with opening 3 which is positionally aligned with nip 4 to direct as described below the molten plastic from extruder 2 the nip 4.

Drum 6 is rotatably mounted to opposite container side walls 39 and 40 by bearing collars 41 and 42, respectively. Drum 5 is securely but rotatably held in position by pairs of bearing assemblies 9, 10, 11 and 12 which are positioned above and below drum 5, as shown. Assembly pairs 9-12 are held in position by bracket assemblies 43 and 44.

Located at one end of drum 5 is air ductwork 45 to which is connected a low pressure, high volume air blower (not shown), preferably designed to blow chilled air, for blowing any pellets formed out of drum cavity 46.

In operation molten plastic from extruder 2 is directed through opening 3 into nip 4. The rotating action of drums 5 and 6 forces the molten plastic through perforations 8 and into cavity 46 where blade edge 30 cuts the now hardening plastics into pellets of the desired size. The size of the particles and the extruding rate of the plastic can be controlled by the rotating rate of drums 5 and 6. Because the extrusion rate can be substantially increased by the apparatus of this invention the time period for maintaining the plastic in molten form is also substantially reduced resulting in a more uniform density pellet as well as increased production rate.

The pellets formed inside cavity 46 are then blown out the end of drum 5 opposite from support arm 28 through duct 47 and into a hopper (not shown).

Because of the extreme difficulty in maintaining the plastic in its proper molten form there will be, even with the apparatus of this invention, the need to clean drum perforations 8. However, this apparatus is designed to allow easy access and removal of drum 5. This is accomplished by lifting lid 18 with hydraulic means 36 unscrewing blade 13A and simply lifting drum 5 out and replacing it with a clean drum. Thus, the operation is stopped for less than an hour. The original dum can then be more quickly and easily cleaned outside container 22.

There are, of course, many other alternates and embodiments of the invention not specifically mentioned, which are meant to be included within the scope of this invention as defined by the following claims.

What I claim is:

1. An apparatus for producing essentially uniform sized particles from molten plastic stock materials, which comprises:

(a) two drums removably mounted inside a hollow container having a retractable lid, said drums rotatingly driven in opposite directions by drive means attached thereto, said drums being positioned parallel and adjacent one another to form a nip into which said stock materials is poured, one of said drums being hollow and perforated over an area of its surface, said hollow drum being rotatably mounted on two pairs of bearing assemblies attached on opposite ends of said hollow drum, each pair of bearing assemblies having one bearing assembly positioned above the other bearing assembly, the top bearing assembly being attached to said lid and retractable from said hollow drum with said lid;

(b) an assembly for cutting said stock material at the inside surface of said hollow drum as said material flows through said perforations; and (c) a means for removing the cut material from the interior of said hollow drum.

2. An apparatus according to claim 1 wherein said assembly for cutting the plastic material comprises a scraping means positioned adjacent said inside surface parallel to the axis of said hollow drum and removably attached to said container.

* * * * *